US009033370B2

(12) United States Patent
Syrjänen et al.

(10) Patent No.: US 9,033,370 B2
(45) Date of Patent: May 19, 2015

(54) METHOD OF PRODUCING AN INFORMATION PAGE FOR A SECURITY DOCUMENT

(75) Inventors: Taru Syrjänen, Vantaa (FI); Mika Holmberg, Helsinki (FI)

(73) Assignee: Setec Oy, Vantaa (FI)

( * ) Notice: Subject to any disclaimer, the term of this patent is extended or adjusted under 35 U.S.C. 154(b) by 1092 days.

(21) Appl. No.: 11/916,845

(22) PCT Filed: Jun. 8, 2006

(86) PCT No.: PCT/FI2006/050241
§ 371 (c)(1),
(2), (4) Date: Dec. 7, 2007

(87) PCT Pub. No.: WO2006/131602
PCT Pub. Date: Dec. 14, 2006

(65) Prior Publication Data

US 2008/0191461 A1 Aug. 14, 2008

(30) Foreign Application Priority Data

Jun. 10, 2005 (EP) .................................... 05105108

(51) Int. Cl.

| | |
|---|---|
| ***B42D 1/00*** | (2006.01) |
| ***B42D 5/00*** | (2006.01) |
| ***B42D 15/00*** | (2006.01) |
| ***G09C 3/00*** | (2006.01) |
| ***B42D 15/10*** | (2006.01) |
| ***B42D 25/00*** | (2014.01) |
| *B42D 25/24* | (2014.01) |

(52) U.S. Cl.
CPC ................ *B42D 25/00* (2013.01); *B42D 25/24* (2013.01); *Y10S 283/901* (2013.01)

(58) Field of Classification Search
USPC ........... 281/2, 3.1, 15.1, 51; 283/63.1, 70, 72, 283/74, 75, 77, 106, 107, 108, 109, 117, 283/901
See application file for complete search history.

(56) References Cited

U.S. PATENT DOCUMENTS

| | | | | |
|---|---|---|---|---|
| 6,135,503 | A | 10/2000 | Lob et al. | |
| 2005/0248147 | A1 * | 11/2005 | Staub et al. | 283/72 |

FOREIGN PATENT DOCUMENTS

| | | | |
|---|---|---|---|
| EP | 0 917 996 | A2 | 5/1999 |
| EP | 1 008 459 | A1 | 6/2000 |

(Continued)

*Primary Examiner* — Shelley Self
*Assistant Examiner* — Justin V Lewis
(74) *Attorney, Agent, or Firm* — Panitch Schwarze Belisario & Nadel LLP

(57) ABSTRACT

The present invention relates to a multilayer information page (1) for a security document, which includes an information part (3) manufactured from a material allowing at least some identification information of the information page to be entered thereto by utilizing laser engraving, the identification information provided on the information page (1) being readable from an upper surface thereof, and a flexible and bending resistant connecting part (2) for connecting the information page (1) to the security document, the connecting part (2) comprising a fastening end (8) by means of which the connecting part (2) is fastened to the information part (3). In order to ensure that detachment of the information part and the connecting part from one another leaves visible marks, the fastening end (3) of the connecting part (2) is arranged to overlap with a lower surface of the information part (3). Furthermore, the information page (1) includes a transparent surface layer (7) which covers at least the fastening end (8) and at least a part of the lower surface of the information part (3) and through which at least the fastening end (8) is visible.

11 Claims, 1 Drawing Sheet

(56) References Cited

FOREIGN PATENT DOCUMENTS

| | | | |
|---|---|---|---|
| EP | 1 245 407 | A2 | 10/2002 |
| EP | 1 380 442 | A1 | 1/2004 |
| EP | 1 516 749 | A2 | 3/2005 |
| WO | 98/19870 | A1 | 5/1998 |
| WO | WO 9819870 | A1 * | 5/1998 |
| WO | WO 2004011272 | A2 * | 2/2004 |
| WO | 2004/110780 | A1 | 12/2004 |
| WO | 2005/028209 | A2 | 3/2005 |

* cited by examiner

METHOD OF PRODUCING AN INFORMATION PAGE FOR A SECURITY DOCUMENT

CROSS-REFERENCE TO RELATED APPLICATION

This application is a Section 371 of International Application No. PCT/FI2006/050241, filed Jun. 8, 2006, which was published in the English language on Dec. 14, 2006, under International Publication No. WO 2006/131602 A1 and the disclosure of which is incorporated herein by reference.

FIELD OF THE INVENTION

The present invention relates to a multilayer information page for a security document, such a passport, and particularly to a solution whereby such an information page is left with visible marks if an attempt at changing its information part has been made.

DESCRIPTION OF THE PRIOR ART

Properties to be required from an information page of a security document are partly contradictory. First, the structure of an information part of the information page, whereto information of the information page has been entered, should make it impossible for a forger to disassemble the information part. A further requirement is that at least some of the information to be provided on the information page can be entered thereto by utilizing laser engraving. In order to achieve these goals, in practice the information part has to be manufactured from a material whose bending properties and bending resistance are poor and which, in order to make the entered information easier to see, is not transparent.

However, an information page should have good bending properties as well as good bending resistance. Consequently, it is necessary to fasten a flexible and bending durable connecting part to the information part so as to enable the information page to be connected to the security document. In order to achieve a sufficient security level, the information part of the information page is to be connected to the connecting part in a manner not allowing these parts to be detached from one another without leaving visible marks to reveal this.

A solution is previously known which includes arranging a fastening end of a connecting part to penetrate into an information part of an information page. In this solution, prior to laminating the information page, the fastening end of the connecting part is arranged between non-transparent films that form the information part. After lamination, the fastening end has been firmly fastened to the information part, as a result of the lamination.

The most significant drawback of the aforementioned known solution is that a forger may cut and break the connecting part at a point where the fastening end penetrates into the information part. In such a case, a point of cut at least partly remains inside the non-transparent information part. When the forger then fastens another information part to the security document in place of the original one, it is in practice extremely difficult to detect that the information part has been changed.

SUMMARY OF THE INVENTION

An object of the present invention is to provide a solution which makes it even more difficult to detach an information part and a connecting part for an information page from one another without leaving visible marks to reveal this. This object is achieved by a method in accordance with the attached independent claim 1 as well as by an information page in accordance with the attached independent claim 5.

The invention avoids a need to arrange a fastening end of a connecting part to penetrate into the material of a non-transparent information part. Instead, the fastening end is arranged to overlap with a lower surface of the information part. In order to make the structure as laborious to disassemble as possible, a transparent surface layer is arranged to cover at least a part of the lower surface of the information part as well as the fastening end of the connecting part. This enables a possible point of discontinuity caused by cutting off the connecting part to be detected through the transparent surface layer. Thus, the solution of the invention makes it considerably easier to detect any attempts at forgery where the information part of a security document has been changed.

Arranging the fastening end to overlap with the lower surface of the information part provides the advantage that an information area of an upper surface of the information part, wherefrom identification information is read, does not decrease in size when compared with prior art solutions. This enables a reliable fastening between the connecting part and the information part to be achieved while at the same time the size of the information area available for entering identification information still meets standard requirements.

In a preferred embodiment of the invention, a security element is arranged in the transparent surface layer or between the transparent surface layer and the fastening end. In such a case, the security element covers a part of the fastening end. A security element herein refers to a visible pattern, such as a hologram, and in connection with forgery it is extremely difficult to cut up such a pattern so that it would remain unnoticed. Preferably, the security element is arranged such that it also covers a seam between the connecting part and the information part.

Preferred embodiments of the method and information page of the invention are disclosed in the attached dependent claims 2 to 4 and 6 to 9.

BRIEF DESCRIPTION OF THE DRAWINGS

In the following, the invention will be described by way of example in closer detail and with reference to the accompanying drawings, in which.

DESCRIPTION OF SOME EMBODIMENTS

Figure 1:
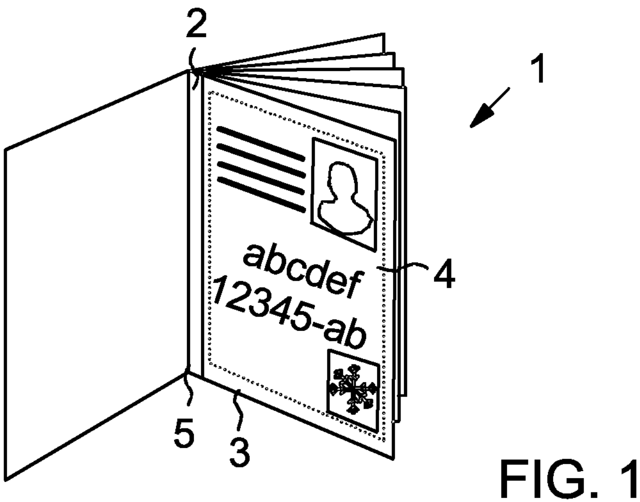
FIG. 1 shows an information page provided in a security document.

FIG. 1 shows an information page 1 according to the invention, which has been connected to a security document. In the example of FIG. 1, the security document is a passport whereto the information page 1 has been fastened by means of its connecting part 2. The information page 1 can be fastened to the security document e.g. by means of a stitch 5, i.e. in the same manner as other pages included in the security document.

An information area 4 of an upper surface of an information part 3 of the information page shows identification information provided on the information page, such as the name, date of birth, photograph, et cetera of the passport owner.

Some of the information may have been entered utilizing e.g. laser engraving technology while some of the information may have been entered utilizing a printing ink.

Figure 2:
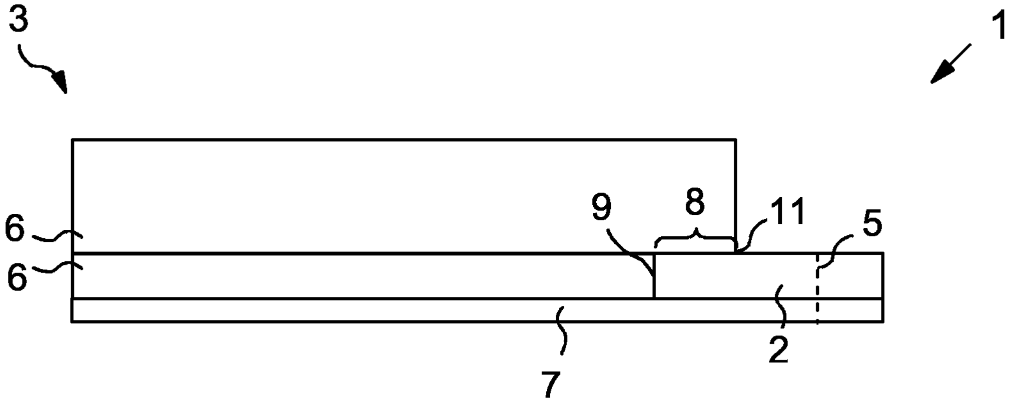
FIG. 2 illustrates a first preferred embodiment of an information page in accordance with the invention.

FIG. 2 illustrates a structure of an information page according to the invention and a method of manufacturing the same. In FIG. 2, an information page according to a first embodiment of the invention is shown in a position wherein identification information provided on the information page, which in this example includes e.g. a photograph and personal data that have been entered into the information page, can be read from an upper surface of the information page that has been turned upwards in the figure.

In the example of FIG. 2, the information part 3 is formed by polycarbonate films 6 forming an accumulation which is non-transparent so as to make the entered information easier to distinguish. In order to enable laser engraving, at least one of the films 6 can be manufactured from clear carbonized polycarbonate. In such a case, energy originating from a laser beam causes the plastic material to darken at points at which energy has been directed. Consequently, desired identification information can be written and drawn by laser engraving.

The connecting part 2 has been arranged such that its fastening end 8 has settled so as to overlap with a lower surface of the information part 3. Since the information part 3 in this exemplary case is formed by two films 6 which have different lengths and which form a "step" in which the fastening end 8 has been placed, a butt seam 9 is formed between the fastening end 8 of the connection part 2 and the information part. The connection part 2 can be made of a perforated or a non-perforated sheet. One alternative is to use a connection part with a net-like structure, such as a woven connection part. It is also possible to use a multi-layer connection part, in which case the connection part can consist of layers made of the same or different materials in order to obtain desired properties.

In FIG. 2, the information page 1 is provided with a transparent surface layer 7 which, in the exemplary case of the figure, covers the entire surface area of the information page 1, i.e. in the case of FIG. 2 the entire surface area of the lower surface. In practice, however, it will suffice that the surface layer 7 covers at least the fastening end 8 and a part of the information part 3 so as to make these more difficult to detach from one another without leaving visible marks that would reveal such detachment. The surface layer 7 may be formed e.g. by a clear polyester (PET) film.

After the parts of the information page have thus been arranged in the position with respect to one another shown in FIG. 2, they are fastened to one another e.g. by lamination. This results in a final information page which is even more difficult to forge without leaving visible marks. Due to the transparency of the surface layer 7, possible cutting marks at the fastening end 8 caused by forgery are easy to detect since the fastening end 8 and preferably also the butt seam 9 can be seen through the surface layer 7. The most probable points at which a forger might try to cut off the information part 3 from the connecting part 2 so as to detach them from one another are the butt seam 9 and a point 11 at which the information part ends. In the information page of FIG. 2, both of these points are visible, which makes it is easy to detect a potential attempt at forgery.

Figure 3:
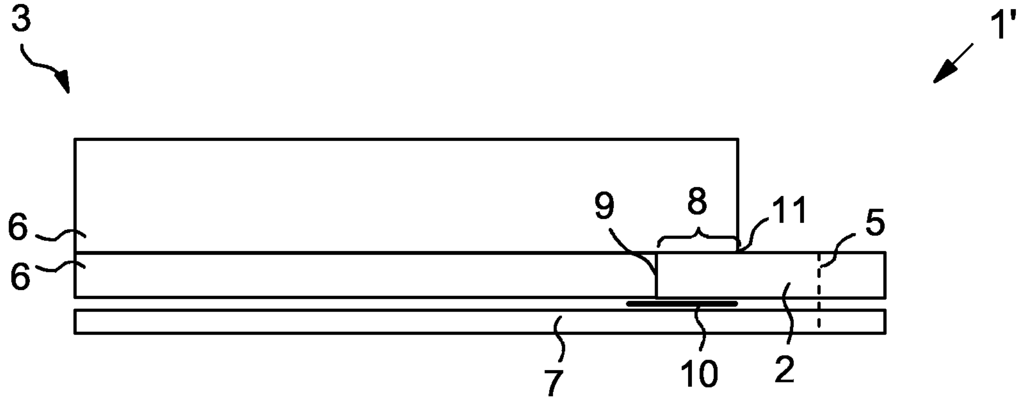
FIG. 3 illustrates a second preferred embodiment of an information page in accordance with the invention.

FIG. 3 illustrates a second preferred embodiment of an information page according to the invention. The embodiment of FIG. 3 mainly corresponds to the embodiment of FIG. 2, so in the following, the embodiment of FIG. 3 will be mainly described by showing differences between these embodiments.

For illustrative reasons, a transparent surface film 7 in FIG. 3 is shown as an element separate from the rest of the parts of an information page 1'. Thus, a security element 10 arranged between the surface film 7 and the connecting part 2 is clearly visible in FIG. 3. The security element 10 may be formed e.g. by a separate visible part provided with a predetermined visible pattern. An alternative is to utilize a hologram, which can be metallized or un-metallized. Alternatively, such an element may be e.g. a colour layer, such as a layer formed by a printing ink, which has been used for producing a predetermined pattern and which, if broken, is left with visible marks.

According to the invention, the security element 10 is arranged in the material of the transparent surface film 7 or, as shown in FIG. 3, between the surface film 7 and a fastening end 8. The security element 10 thus covers a part of the fastening end, and preferably also a part of the butt seam 9, as shown in FIG. 3. If a forger then tries to deconstruct the structure of the information page 1' at the butt seam 9 or by cutting up the connecting part 2 at the security element 10, it is easy to detected this due to the visible damage left in the security element.

It is to be understood that the above description and the related figures are only intended to illustrate the present invention. It will be obvious to one skilled in the art that the invention can be varied and modified in several ways without deviating from the scope of the invention.

The invention claimed is:

1. A method of producing a multilayer information page for a security document comprising:

selecting for use in the information page at least an information part allowing at least some identification information to be entered thereto by utilizing laser engraving and having a lower surface and an opposing upper surface, the identification information provided on the information page configured to be read from the upper surface, the lower surface having a first part and a second part distinct from the first part;

selecting for use in the information page at least a connecting part which defines a plane and is configured to connecting the information page to the security document;

arranging a fastening end of the connecting part to overlap with and directly contact the first part of the lower surface of the information part, the fastening end of the connecting part extending in the plane defined by the connecting part;

forming a transparent surface layer to cover at least the fastening end of the connecting part and to cover and directly contact at least the second part of the lower surface of the information part, such that the fastening end resides between the first part of the lower surface of the information part and the transparent surface layer; and fastening the connecting part, the information part and the transparent surface layer to one another in an overlapping position where the fastening end of the connecting part overlaps with the first part of the lower surface of the information part and the transparent surface layer covers at least the fastening end of the connecting part and covers and directly contacts at least the second part of the lower surface of the information part, such that the fastening end resides between the first part of the lower surface of the information part and the transparent surface layer.

2. A method as claimed in claim 1, wherein fastening is carried out by laminating the parts of the multilayer information page to one another.

3. A method as claimed in claim 1, wherein the method comprises arranging a security element in the transparent surface layer or between the transparent surface layer and the fastening end.

4. A method as claimed in claim 1, wherein the transparent surface layer is arranged to cover the surface area of the entire information page.

5. A multilayer information page for a security document, the page comprising:

an information part having a lower surface and an opposing upper surface, the information part being manufactured from a material which allows at least some identification information to be entered into the information page by utilizing laser engraving, the identification information provided on the information page being readable from the upper surface thereof, the lower surface having a first part and a second part distinct from the first part;

a flexible and bending resistant connecting part which defines a plane and is configured to connect the information page to the security document, the connecting part comprising a fastening end which extends in the plane defined by the connecting part, the fastening end being fastened to the information part in a position where the fastening end overlaps with and directly contacts the first part of the lower surface of the information part; and a transparent surface layer covering at least the fastening end and covering and directly contacting at least the second part of the lower surface of the information part, the connecting part, the information part and the transparent surface layer being fastened to each other in an overlapping position in which the fastening end overlaps with and directly contacts the first part of the lower surface of the information part and the fastening end resides between the first part of the lower surface of the information part and the transparent surface layer, at least the fastening end being visible through the transparent surface layer.

6. An information page as claimed in claim 5, wherein a security element is arranged in the transparent surface layer or between the transparent surface layer and the fastening end.

7. An information page as claimed in claim 6, wherein the security element comprises a hologram.

8. An information page as claimed in claim 6, wherein the security element comprises of a color layer which forms a predetermined pattern.

9. An information page as claimed in claim 5, wherein the transparent surface layer covers the surface area of the entire information page.

10. An information page as claimed in claim 5, wherein the first and second parts of the lower surface of the information part extend parallel to each other in different planes.

11. An information page as claimed in claim 5, wherein the transparent surface layer does not directly contact the first part of the lower surface of the information part.

* * * * *